J. B. BUSHNELL.
GRAIN DRILL.
APPLICATION FILED JULY 31, 1911.
1,031,167.
Patented July 2, 1912.
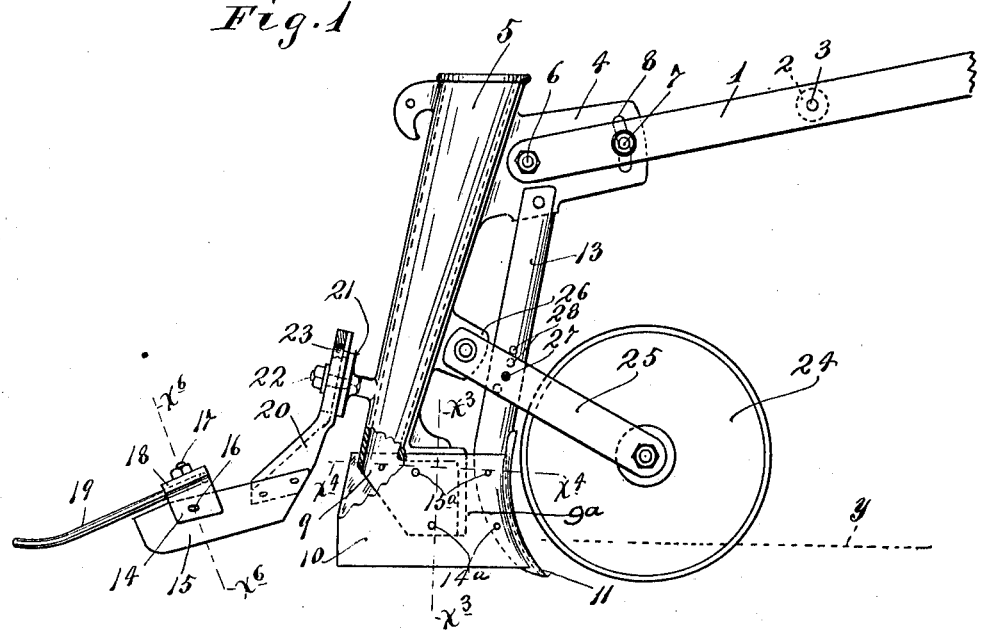
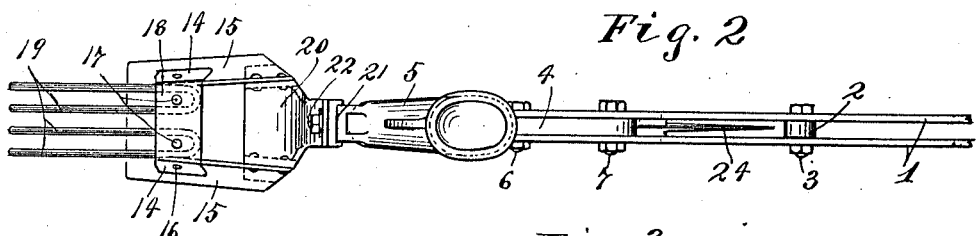
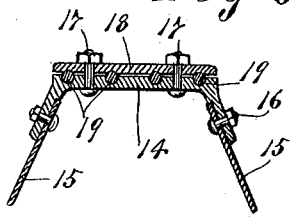
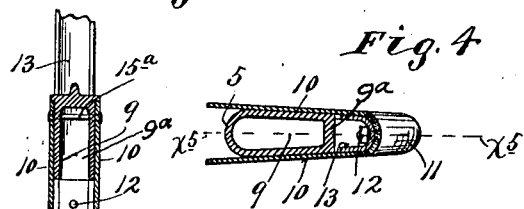
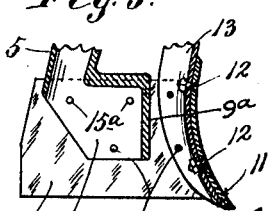
Witnesses.
A. H. Opsahl.
H. A. Hillgren
Inventor.
J. B. Bushnell.
By his Attorneys
Williamson Merchant
COLUMBIA PLANOGRAPH CO., WASHINGTON, D. C.

UNITED STATES PATENT OFFICE.

JOHN B. BUSHNELL, OF MINNEAPOLIS, MINNESOTA.

GRAIN-DRILL.

1,031,167. Specification of Letters Patent. Patented July 2, 1912.

Application filed July 31, 1911. Serial No. 641,613.

*To all whom it may concern:*

Be it known that I, JOHN B. BUSHNELL, a citizen of the United States, residing at Minneapolis, in the county of Hennepin and State of Minnesota, have invented certain new and useful Improvements in Grain-Drills; and I do hereby declare the following to be a full, clear, and exact description of the invention, such as will enable others skilled in the art to which it appertains to make and use the same.

My present invention relates to grain drills and is particularly directed to the improvement of the furrow opening and closing devices.

Generally stated, the invention consists of the novel devices and combinations of devices hereinafter described and defined in the claims.

Hitherto, numerous different forms both of the shoe and of the disk types of furrow openers have been employed in grain drills, and both of these types have had numerous bad, as well as good features. Neither form has been entirely satisfactory. Neither shoes nor disks can be operated to deposit seed at uniform depth. When the earth is hard, so much pressure is required that they draw very heavy and when the earth is freshly plowed, or soft, they automatically bury themselves too deep for proper seeding. But the most serious fault lies in the fact that the grain falls into V-shaped furrows, mixing with the earth as it closes the furrow so that the seeds are, therefore, planted at various different depths from which, it follows, that much of the grain can not germinate and the seeds that do germinate will not grow and stool alike. This causes a great waste of seed and a resulting crop that is not as good as where the seeds are properly distributed and evenly planted.

My invention so improves the shoe form of furrow opener, that the furrow opened for the seed is formed with a smooth bottom of uniform depth and of such width that the seeds will naturally spread out or scatter therein over considerable area. Also this improved furrow opener may be easily drawn through the ground and will operate in all kinds and conditions of soil. The attachment also includes a novel and highly efficient furrow closing device and in some instances, it also includes a novel arrangement of furrow opener rolling colter and furrow closing device.

The preferred form of the invention is illustrated in the accompanying drawings wherein like characters indicate like parts throughout the several views.

Referring to the drawings, Figure 1 is a view in side elevation with some parts broken away, showing the improved device; Fig. 2 is a plan view of the same; Fig. 3 is a detail in vertical section taken on the line $x^3$ $x^3$ of Fig. 1; Fig. 4 is a horizontal section taken on the line $x^4$ $x^4$ of Fig. 1; Fig. 5 is a section taken on the line $x^5$ $x^5$ of Fig. 4; and Fig. 6 is a transverse section taken on the line $x^6$ $x^6$ of Fig. 1.

The numeral 1 indicates a drag bar which, as shown, is made up of a pair of flat metal bars spaced apart by a washer 2, and tied together by a short nutted bolt 3. The members of the drag bar 1, at their rear ends, straddle a heavy draft lug 4 of a tubular seed leg or boot 5, and are pivotally connected to the said leg by a nutted bolt 6. Another nutted bolt 7 passed through perforations in the two members of the drag bar 1 and through a segmental slot 8 in the lug 4, serves to rigidly connect the seed leg 5 to the drag bar with freedom for adjustments on the pivot bolt 6. This adjustment is important as will hereinafter appear. The lower end of the seed leg 5 terminates in a hollow foot portion 9, the sides of which are flat and converge in a forwardly direction. The front edge of the said foot 9 is closed by a vertical web 9ª so that dirt cannot pass directly rearward into the same.

The furrow opener proper, or, in other words, the shoe, is made up of a pair of laterally spaced so-called land side plates 10, and a so-called plow point 11. The plow point 11 is preferably curved both in a horizontal and in a transverse horizontal direction and, advisably, is in the form of a hardened steel member rigidly, but detachably secured by short nutted bolts 12, to the correspondingly formed lower end of a channel-shaped bar or supplemental leg 13, the upper end of which is bolted or riveted to the lug 4 of the seed leg 5. The said plow point 11 is directly interposed between the front edges of the land side plates 10 and its lower end extends below the lower edges of the said plates so that it is better adapted to enter the ground (see particularly Fig. 1).

The said side plates 10 are rigidly secured to the sides of the head 9 and to the side flanges of the bar 13, preferably by rivets 14ª and small bolts 15ª. The rivets 14ª are where they may be cut, and the bolts 15ª may be easily removed, whenever it is desired to remove the worn out plates 10 and to substitute new plates therefor. Preferably, the plates 10 converge slightly in a forward direction and their lower edges are so arranged that they will be horizontal when the furrow opener is at work in the furrow. In Fig. 1, the ground surface is indicated by the dotted lines marked $y$. In practice, the front end of the drag bar 1 will be pivoted in any suitable way to the front portion of a seeder frame. The point of pivotal attachment of the said frame will remain approximately constant. When the furrow opener attachment is raised and lowered, it will move in the arc of a circle struck from the said pivotal connection between the drag bar and machine frame, and, as it is raised from its working position shown in Fig. 1, the lower edges of the land side plates 10 will be given a forward pitch or inclination. Also when the device is lowered into action, the lower end of the plow point 11 will come into action upon the ground while the lower edges of the land side plates 10 are forwardly inclined. This, together with the rearwardly, upwardly extended curve of the plow point 11, gives the shoe a natural tendency to draw itself down into the ground when drawn forward until the lower edges of the said land side plates reach a horizontal position, and then these lower edges of the said plates will resist further depression of the shoe into the ground. The shoe or furrow opener is, therefore, in a sense, self-regulating in its depth or cut. This depth or cut, however, may be predetermined and either increased or decreased from the depth indicated in the drawings by adjustments of the attachment in respect to the drag bar 1, on the pivotal point 6. It will, of course, be understood that the pivotal adjustments of the attachment, in respect to the drag bar indicated, will vary the depth to which the shoe or furrow opener will necessarily be lowered, in order to bring the lower edges of the plates 10 into horizontal positions. The bar or supplemental leg 13 is, for economy and lightness, made as a part separate from the seed leg or boot 5, but it may, as is obvious, be cast integral therewith, or formed as a deep web or flange thereof.

To close the furrow made by the furrow opener, above described, I preferably provide a furrow closing device of novel construction and which, as shown, comprises an inverted channel-shaped tie bar 14, the flanges of which diverge downwardly and forwardly, and to which gathering plates 15 are, as shown, rigidly but detachably secured by short nutted bolts 16. These gathering plates 15 also diverge downwardly and forwardly so that under forward movement of the machine, they will gather up and scrape more or less of the dirt back into the furrow formed by the shoe or furrow opener, and thus cover the seed which is sowed in the furrow through the seed leg 5. The tie bar 14 is rigidly but detachably secured by short nutted bolts 17 to a clamping bar 18 between which and the said bar 14, rearwardly projecting rake tines or flanges 19 are clamped. The upper edges of the front ends of the gathering plates 15 are riveted, or otherwise rigidly secured to a head 20 provided with an upper end extension that is mounted to slide vertically on the head of a lug 21, which, as shown, is cast integral with the lower rear portion of the seed leg 5. A short nutted bolt 22 seated in the lug 21, works through a slot 23 in the head 20, serves to rigidly connect the gathering plates 15, in respect to the seed leg and furrow opener, but with freedom for vertical adjustment in respect thereto. The said gathering plates 15, in addition to their main function of closing the furrow, also perform another important function, to-wit, they act as auxiliary devices which are effective, even in the softest kind of ground, to prevent the furrow opener or shoe from sinking into the ground beyond a predetermined intended depth. It is here important to further note that the said gathering plates 15 are inclined bodily in a direction from their front toward their rear ends so that under forward movement, they tend to climb rather than to sink into the ground. Also, it will be noted, that the rear ends of the rake tines 19 are arranged to work the upper surface of the soil of the closed furrow so as to thereby spread out and evenly distribute the earth over the deposited seed. The rake tines pulverize the earth over the seed and press the finely pulverized earth into contact with and around the seeds, so as to preserve the moisture and permit the seeds to all germinate and grow and stool alike, resulting in a greater growth, better stooling, even ripening, a better yield of grain, and a very great saving in the amount of seed required.

As already indicated, the furrow formed by the furrow opener will have a level, approximately flat bottom over which the seed deposited in the furrow is scattered or spread out, and thus sowed at a perfectly uniform depth.

In using this device in soil containing sod, roots, and the like, it is often desirable to employ a sharp edged rolling colter immediately in front of the furrow opener proper. In Figs. 1 and 2, this rolling colter is shown as in the form of a flat sharp edged steel disk 24, that is journaled to the front end of an arm 25, preferably made up of a pair of laterally spaced metal straps pivotally connected at their rear ends to a lug 26 on the intermediate front portion of the seed leg 5. To hold the colter 24 in the desired vertical adjustment in respect to the lower end of the plow point 11, a bolt or pin 27 is passed through the straps of the arm 25 and through one or the other of several perforations 28 formed in the bar 13.

By reference to Fig. 1, it will be noted that the colter wheel 24 has its lower edge set below the horizontal lower edges of the furrow opening shoe. This is important because it cuts an initial opening below the bottom of the shoe and through which the shoe is free to pass.

What I claim is:

1. A furrow opening shoe for seeding machines having approximately flat and vertical land side plates with approximately straight lower edges, and a plow point joined with the front edges of said side plates.

2. A furrow opening shoe for seeding machines having approximately flat and vertical land side plates with approximately straight lower edges, and a plow point joined with the front edges of said side plates, the lower extremity of said plow point being extended below the lower edges of said side plates.

3. A furrow opening shoe for seeding machines having approximately flat and vertical land side plates with approximately straight lower edges, and a plow point joined with the front edges of said side plates, the lower extremity of said plow point being extended below the lower edges of said side plates, and the exposed front portion thereof being extended upwardly and rearwardly, substantially as described.

4. A furrow opening shoe for seeding machines having approximately flat and vertical land side plates with approximately straight lower edges, and a plow point joined with the front edges, of said side plates, in combination with a drag bar and a seed delivery leg attached to said drag bar at its upper portion and having its lower portion interposed between and secured to the said side plates.

5. A furrow opening shoe for seeding machines having approximately flat and vertical land side plates with approximately straight lower edges, and a plow point joined with the front edges of said side plates, in combination with a drag bar and a seed delivery leg attached to said drag bar at its upper portion and having its lower portion interposed between and secured to the said side plates, and a supplemental bar extended upward directly from the upper portions of said plow point, and secured to the front end portions of said side plates.

6. A furrow opener for seeding machines comprising a pair of laterally spaced approximately vertical land side plates having approximately straight lower edges and flaring slightly rearward, and an upwardly and rearwardly inclined plow point joined with the front edges of said side plates.

7. A furrow opener for seeding machines comprising a pair of laterally spaced approximately vertical land side plates having approximately straight lower edges and flaring slightly rearward, and an upwardly and rearwardly inclined plow point joined with the front edges of said side plates, and the lower extremity of said plow point being extended below the lower edges of said side plates, substantially as described.

8. The combination with a seed delivery leg and a furrow opening shoe at the lower extremity thereof, of a covering device secured to said seed leg at the rear of said shoe, and having a plurality of fingers or rods for engagement with the ground, and means for vertically adjusting said covering device in respect to said shoe.

9. The combination with a drag bar, of a seed leg connected to said drag bar with freedom for angular adjustments in a vertical plane, a shoe secured to the lower end of said seed leg, and a colter wheel located in front of said shoe and secured to said seed leg and adjustable therewith in respect to said drag bar.

10. The combination with a drag bar, of a seed leg connected to said drag bar with freedom for angular adjustments in a vertical plane, a shoe secured to the lower end of said seed leg, a colter wheel located in front of said shoe and secured to said seed leg and adjustable therewith in respect to said drag bar, and means for vertically adjusting said colter wheel in respect to said seed leg and shoe.

In testimony whereof I affix my signature in presence of two witnesses.

JOHN B. BUSHNELL.

Witnesses:
HARRY D. KILGORE,
F. D. MERCHANT.

Copies of this patent may be obtained for five cents each, by addressing the "Commissioner of Patents, Washington, D. C."